(12) United States Patent
Caponetti et al.

(10) Patent No.: US 10,344,740 B2
(45) Date of Patent: *Jul. 9, 2019

(54) METHODS AND SYSTEMS FOR DETECTING SENSOR FAULT MODES (71) Applicant: VESTAS WIND SYSTEMS A/S, Aarhus N (DK)

(72) Inventors: Fabio Caponetti, Aarhus C (DK); Per Brath, Randers Nv (DK); Keld Hammerum, Hadsten (DK); Johnny Nielsen, Svenstrup J (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 4 days.

This patent is subject to a terminal disclaimer.

(21) Appl. No.: 15/269,839

(22) Filed: Sep. 19, 2016

(65) Prior Publication Data

US 2017/0009739 A1    Jan. 12, 2017

Related U.S. Application Data

(63) Continuation of application No. 13/287,946, filed on Nov. 2, 2011, now Pat. No. 9,447,778.

(51) Int. Cl.
*F03D 3/04* (2006.01)
*F03D 7/04* (2006.01)
(Continued)

(52) U.S. Cl.
CPC ........... *F03D 7/042* (2013.01); *F03D 7/0224* (2013.01); *F03D 17/00* (2016.05); *F03G 7/00* (2013.01); *G05B 15/02* (2013.01)

(58) Field of Classification Search
CPC ..................................................... F03D 7/042
(Continued)

(56) References Cited

U.S. PATENT DOCUMENTS 5,818,585 A    10/1998  Davis et al.
7,909,575 B2 *  3/2011  Barbu ................... F03D 7/022
                                                     416/1

(Continued)

FOREIGN PATENT DOCUMENTS

DE      102004044335 A1   4/2006
GB          2440953 A     2/2008
(Continued)

OTHER PUBLICATIONS

European Search Report dated May 8, 2012 for EP Application No. 11187529.0.

*Primary Examiner* — Ricky Ngon
(74) *Attorney, Agent, or Firm* — Patterson + Sheridan, LLP (57) ABSTRACT

A method of detecting a fault mode of a sensor is provided. The sensor may be, for example, a bending moment sensor and may sense a bending moment of a blade on a wind turbine generator (WTG). The method includes comparing data output by a first sensor with reference data indicating what is expected to be output by the first sensor to produce a first comparison result and comparing data output by the first sensor with data output by a second sensor to produce a second comparison result. A determination of whether the first sensor has entered a fault mode is made based at least in part on the first and second comparison results.

18 Claims, 5 Drawing Sheets

(51) Int. Cl.
*F03G 7/00* (2006.01)
*F03D 17/00* (2016.01)
*F03D 7/02* (2006.01)
*G05B 15/02* (2006.01)

(58) Field of Classification Search
USPC .......................................................... 702/35
See application file for complete search history.

(56) References Cited

U.S. PATENT DOCUMENTS

| | | | | |
|---|---|---|---|---|
| 8,082,115 | B2* | 12/2011 | Bechhoefer | F03D 7/047 290/44 |
| 8,255,173 | B2* | 8/2012 | Fujioka | F03D 17/00 290/44 |
| 8,442,778 | B2* | 5/2013 | Bechhoefer | F03D 7/047 290/44 |
| 8,463,085 | B2* | 6/2013 | Cribbs | F03D 1/0675 356/32 |
| 8,546,967 | B2* | 10/2013 | Ormel | F03D 7/042 290/44 |
| 2005/0276696 | A1* | 12/2005 | LeMieux | F03D 7/02 416/61 |
| 2008/0317598 | A1* | 12/2008 | Barbu | F03D 7/022 416/9 |
| 2010/0004878 | A1 | 1/2010 | Volanthen et al. | |
| 2010/0074749 | A1* | 3/2010 | Garrido | F03D 7/0296 416/31 |
| 2011/0042950 | A1* | 2/2011 | Mizoue | F03D 7/0264 290/44 |
| 2011/0125419 | A1* | 5/2011 | Bechhoefer | F03D 7/047 702/34 |
| 2011/0148112 | A1* | 6/2011 | Ormel | F03D 7/042 290/44 |
| 2011/0211200 | A1* | 9/2011 | Cribbs | F03D 1/0675 356/614 |
| 2011/0213590 | A1 | 9/2011 | Middendorf et al. | |
| 2011/0268571 | A1* | 11/2011 | Menke | G08C 23/04 416/61 |
| 2011/0270577 | A1* | 11/2011 | Mihok | F03D 7/048 702/188 |
| 2012/0035865 | A1* | 2/2012 | Fujioka | F03D 17/00 702/42 |
| 2012/0045330 | A1* | 2/2012 | Wu | F03D 7/042 416/1 |
| 2012/0065901 | A1* | 3/2012 | Bechhoefer | F03D 7/047 702/34 |
| 2012/0161446 | A1* | 6/2012 | McNeill | F03D 1/0675 290/55 |
| 2012/0292905 | A1* | 11/2012 | Slot | F03D 1/065 290/44 |
| 2013/0003071 | A1* | 1/2013 | Mamidipudi | G01S 17/58 356/448 |
| 2013/0250276 | A1* | 9/2013 | Chang | G01S 17/87 356/28.5 |
| 2014/0163904 | A1* | 6/2014 | Bechhoefer | F03D 7/047 702/34 |

FOREIGN PATENT DOCUMENTS

| | | | | |
|---|---|---|---|---|
| WO | | 2009109655 A1 | 9/2009 | |
| WO | WO | 2009109655 A1 * | 9/2009 | ............ F03D 7/042 |

* cited by examiner

METHODS AND SYSTEMS FOR DETECTING SENSOR FAULT MODES

RELATED APPLICATIONS

This application is a continuation of co-pending U.S. patent application Ser. No. 13/287,946, filed Nov. 2, 2011. The aforementioned related patent application is herein incorporated by reference in its entirety.

FIELD OF THE INVENTION

The present invention relates generally to methods and systems for detecting fault modes in a sensor, and in particular, to methods and systems for detecting fault modes in a fiber optic sensor used to measure a bending moment experienced by a blade of a wind turbine generator (WTG).

BACKGROUND OF THE INVENTION

Many modern wind turbine generators (WTGs) are equipped with generally long and slender blades that are designed to flex or bend in response to wind forces. While some bending is expected, the blade can suffer damage if it bends beyond an extreme limit or too frequently. The risk of such damage is greater in proportion to the ever increasing size of blades used in modern WTGs. Therefore, to detect the occurrence of bending, among other reasons, modern WTG blades are sometimes equipped with bending moment measuring sensors that measure a bending moment experienced at one or more points along the span of each blade. To avoid electromagnetic interference the sensors are often implemented using fiber bragg gratings (FBGs) in a fiber optic cable.

Bending moment sensors are not limited to use with blades of a WTG. Therefore, the use of bending moment sensors with WTG blades is merely one example use. Another example use includes measurement of a bending moment in a conduit, such as a marine riser used in deep water oil exploration, or any other structure having a generally long slender shape used in a manner and/or environment that exposes the structure to frequently changing loads and/or extreme loads. One problem associated with the use of any sensor is the risk of the sensor entering a fault mode. A fault mode is a mode in which the sensor behaves in a way that deviates from its nominal behavior. The nominal behavior is the one that fulfills all the requirements imposed by systems that directly or indirectly make use of the sensor's output. Thus, risk of failure or poor performance for any such systems will increase if the sensor enters a fault mode. Accordingly, identification of the occurrence of a fault mode can help reduce risk of failure and improve performance. Moreover, reducing risk of failure and poor performance is useful for modern WTGs because they operate in remote locations, making technician servicing difficult and costly, and are often required to have long operational lifetimes, e.g., twenty years.

U.S. Patent Application Publication Number 2010/0232961 (the '961 patent publication) describes one fiber optic sensor that is used to measure a bending moment experienced by blade of a WTG. The optical fiber used in the '961 patent publication has two alternative output points, each connectable to a data processing device. Consequently, in the event of a breakage in the optical fiber, signals from the sensor are available from at least one of the output points.

The '961 patent publication appears to address the occurrence of only one fault mode, namely, optical fiber breakage. Other sensor fault modes may occur, however, such as partial or complete loss of power in the sensor output, loss of sensor calibration, and/or signal processing errors. Moreover, fault modes of a sensor may manifest at a high level (i.e., at a level that takes into account external data or data other than that available from the sensor) or at a low level (i.e., at a level that takes into account internal data or data available from or pertaining to only the sensor). Identifying other fault modes would help increase reliable performance and reduce the risk of failure and associated repair costs. Furthermore, the ability to distinguish among different fault modes and fault modes at different levels would improve the ability to identify appropriate diagnostic techniques to apply.

SUMMARY OF THE INVENTION

According to a first aspect the invention provides a method of detecting a fault mode of a sensor. The sensor may be, for example, a bending moment sensor and may sense a bending moment of a blade on a wind turbine generator (WTG). The method includes comparing data output by a first sensor with reference data indicating what is expected to be output by the first sensor to produce a first comparison result and comparing data output by the first sensor with data output by a second sensor to produce a second comparison result. A determination of whether the first sensor has entered a fault mode is made based at least in part on the first and second comparison results. By detecting a fault mode of the sensor the risk of undue reliance on the sensor may be reduced in a timely manner without the need for technician servicing.

In an embodiment of the method according to the first aspect of the invention, the first sensor is configured for use in measuring a first characteristic of a structure and the second sensor is configured for use in measuring a second characteristic of the structure. In a further embodiment, the structure is a wind turbine generator (WTG), the first characteristic of the structure is a bending moment experienced by a first blade of the WTG, and the second characteristic of the structure is one of: a bending moment experienced by a second blade of the WTG, a rotation speed of a generator of the WTG, an acceleration of a nacelle of the WTG, an acceleration of the blade of the WTG, a thrust force of wind on the WTG, a rotation speed of a rotor of the WTG, and a pitch angle of at least one of the blades of the WTG.

In another embodiment of the method according to the first aspect of the invention, the first sensor is configured for use in measuring a characteristic of a structure and the second sensor is configured for use in measuring a characteristic of the environment in which the structure is located. In a further embodiment, the structure is a WTG, the characteristic of the structure is a bending moment experienced by a blade of the WTG, and the characteristic of the environment is one of: a wind speed, a wind direction, a density of air surrounding the WTG, and a temperature of air surrounding the WTG.

In yet another embodiment of the method according to the first aspect of the invention, the method further includes sending an indication of the detected fault mode to a controller that performs control operations in dependence on the data output by the first sensor.

In yet another embodiment of the method according to the first aspect of the invention, the method further includes sending an indication of the detected fault mode to a controller of the first sensor, and compensating, at the sensor controller, for the detected fault mode.

According to a second aspect the invention provides a method for detecting fault modes of a bending moment sensor for a blade of a WTG. The method includes operating the sensor to generate data representing a bending moment experienced by the blade, and comparing the data generated by the sensor with reference data indicating what is expected to be generated by the sensor to produce a comparison result. A determination is made as to whether the sensor has entered a fault mode based at least in part on the comparison result.

In one embodiment according to the second aspect of the invention, the sensor includes a fiber bragg grating (FBG) configured for placement on a surface of the blade and sensor circuitry configured to optically couple to the FBG via an optical fiber. Moreover, the sensor circuitry includes a light source configured to emit a light signal and a light receiver configured to receive a reflection of the light signal from the FBG and to convert the reflected light signal into the sensor generated data. Comparing the sensor generated data with the reference data to produce a comparison result may include comparing a signal power level indicated by the sensor generated data with a signal power level indicated by the reference data to produce a power comparison result. In a further embodiment, the method further includes modifying power output by the light source in response to determining that the sensor has entered a fault mode based at least in part on the power comparison result.

In an alternative embodiment according to the second aspect of the invention, the sensor includes the FBG and the sensor circuitry described above. However, in this alternative embodiment, comparing the sensor generated data with the reference data includes comparing a mean signal frequency indicated by the sensor generated data with a mean signal frequency indicated by the reference data to produce a mean frequency comparison result. In a further embodiment, the method further includes compensating for a frequency offset of the sensor in response to determining that the sensor has entered a fault mode based at least in part on the mean frequency comparison result.

According to a third aspect the invention provides a method for detecting fault modes in one or more of a plurality of sensors. The method includes operating first and second sensors, at least the first sensor producing data representing a bending moment experienced by a blade of the WTG, and comparing data output by the first sensor with data output by the second sensor to produce a comparison result. A determination is then made as to whether the first sensor has entered a fault mode based at least in part on the comparison result.

In one embodiment according to the third aspect of the invention, the first sensor includes an FBG configured for placement on a surface of the blade and sensor circuitry configured to optically couple to the FBG via an optical fiber. The sensor circuitry includes a light source configured to emit a light signal, and a light receiver configured to receive a reflection of the light signal from the FBG and to convert the reflected light signal into the data representing the bending moment experienced by the blade.

According to a fourth aspect the invention provides an apparatus for detecting fault modes in a first sensor. The apparatus comprises low level fault detection circuitry and high level fault detection circuitry. The low level fault detection circuitry is configured to compare data output by the first sensor with reference data produced by the first sensor while operating the first sensor in a controlled environment. A fault mode of the first sensor may be detected based at least in part on the comparison. Moreover, the high level fault detection circuitry is configured to compare data output by the first sensor with data output by a second sensor to detect a fault mode of the first sensor.

According to a fifth aspect the invention provides a WTG with low level sensor fault detection. The WTG includes a blade configured to rotate in response to a wind force and a sensor configured for use in measuring a bending moment experienced by the blade. The WTG further includes fault detection circuitry that is configured to compare data output by the sensor during operation with the reference data to determine whether the sensor has entered a fault mode.

According to a sixth aspect the invention provides a WTG with high level sensor fault detection. The WTG includes a first blade configured to rotate in response to a wind force and a first sensor configured for use in measuring a bending moment experienced by the first blade. The WTG further includes fault detection circuitry that is configured to compare data output by the first sensor with data output by a second sensor to determine whether the first sensor has entered a fault mode.

In one embodiment according to the sixth aspect of the invention, the WTG further comprises a second blade and the second sensor is configured for use in measuring a bending moment experienced by the second blade.

In another embodiment according to the sixth aspect of the invention, the second sensor is configured for use in measuring a characteristic of the WTG other than a bending moment experienced by a blade.

In yet another embodiment according to the sixth aspect of the invention, the second sensor is configured for use in measuring a characteristic of the environment in which the WTG is located.

BRIEF DESCRIPTION OF THE DRAWINGS

The invention will be better understood with reference to the detailed description when considered in conjunction with the non-limiting examples and the accompanying drawings.

DETAILED DESCRIPTION OF THE INVENTION

The following is a detailed description of embodiments of the invention depicted in the accompanying drawings. The embodiments are examples and are in such detail as to clearly communicate the invention. However, the amount of detail offered is not intended to limit the anticipated variations of embodiments; but on the contrary, the intention is to cover all modifications, equivalents, and alternatives falling within the spirit and scope of the present invention as defined by the appended claims.

Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Wind turbine generators (WTGs) are subject to loading due to wind forces, rotational motion, gravity, and the like. This loading is usually undesirable and is therefore often monitored and sometimes controlled with the use of sensors. For example, the blades of some modern wind turbines have stress sensors or gauges mounted typically on an inner surface thereof. The stress sensors are capable of measuring and reporting to a central controller an amount of stress experienced by the blade. However, WTGs are often in remote locations and are designed to operate with little maintenance and supervision. Therefore, occurrence of a fault mode in a sensor may escape detection. If control of the WTG depends on a sensor that experiences a fault mode, the WTG may operate inefficiently, or worse, may suffer damage. Example methods and systems described herein can be used to detect fault modes of a sensor in a WTG, thereby facilitating avoidance of such risks. Moreover, although a WTG is frequently referred to herein as an example structure that uses sensors, other structures are known to include similar sensors that can enter fault modes. Therefore, the methods and systems described herein are not limited to use with WTGs.

Figure 1:
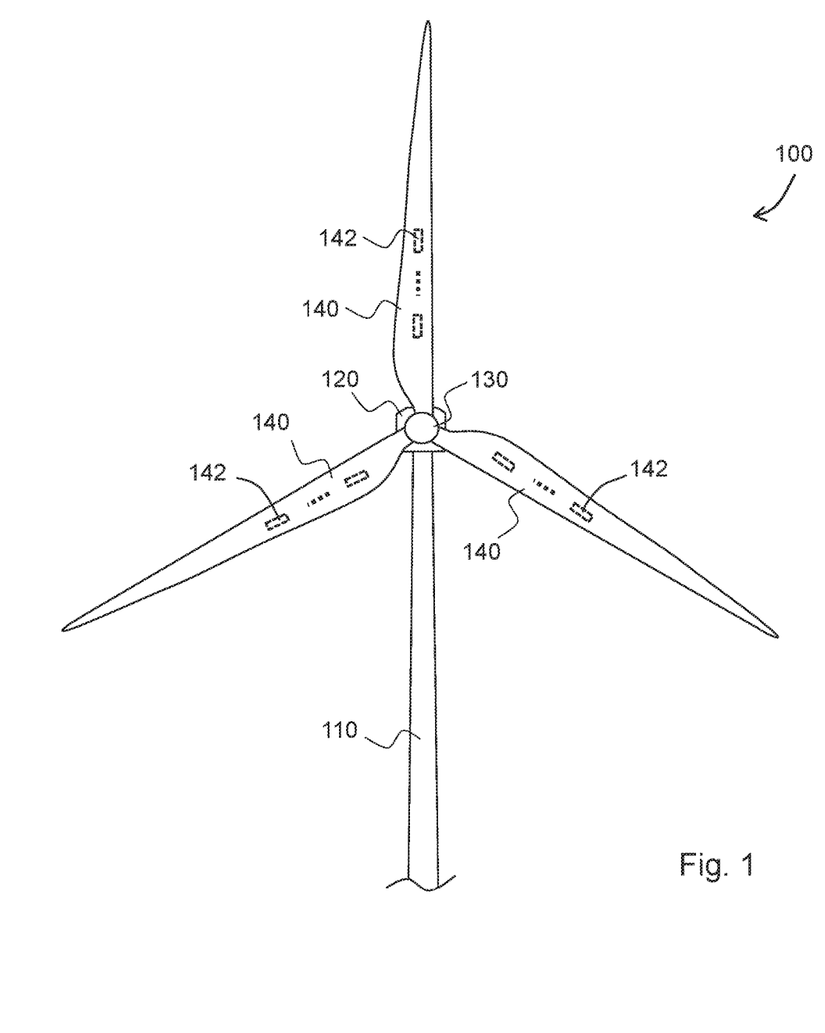
FIG. 1 shows a general structure of a WTG, which is an example structure that uses sensors for which a fault mode may be detected.

FIG. 1 illustrates an example WTG 100 according to an embodiment. As illustrated in FIG. 1, the WTG 100 includes a tower 110, a nacelle 120, and a rotor 130. In one embodiment, the WTG 100 may be an onshore wind turbine. However, embodiments of the invention are not limited only to onshore wind turbine. In alternative embodiments, the wind turbine 100 may be an offshore wind turbine located over a water body such as, for example, a lake, an ocean, or the like. The tower 110 of such an offshore wind turbine is installed on either the sea floor or on platforms stabilized on or above the sea level.

The tower 110 of the WTG 100 may be configured to raise the nacelle 120 and the rotor 130 to a height where strong, less turbulent, and generally unobstructed flow of air may be received by the rotor 130. The height of the tower 110 may be any reasonable height, and should consider the length of wind turbine blades extending from the rotor 130. The tower 110 may be made from any type of material, for example, steel, concrete, or the like. In some embodiments the tower 110 may be made from a monolithic material. However, in alternative embodiments, the tower 110 may include a plurality of sections. In some embodiments of the invention, the tower 110 may be a lattice tower. Accordingly, the tower 110 may include welded steel profiles.

The rotor 130 may include a rotor hub (hereinafter referred to simply as the "hub") 132 and at least one blade 140 (three such blades 140 are shown in FIG. 1). The rotor hub 132 may be configured to couple the at least one blade 140 to a shaft (not shown). In one embodiment, the blades 140 may have an aerodynamic profile such that, at predefined wind speeds, the blades 140 experience lift, thereby causing the blades to radially rotate around the hub. The hub 132 may further comprise mechanisms (not shown) for adjusting the pitch of the blade 140 to increase or reduce the amount of wind energy captured by the blade 140. Pitching adjusts the angle at which the wind strikes the blade 140. In certain embodiments, however, the pitching mechanisms may be omitted and, consequently, the pitch of the blades 140 cannot be adjusted in such embodiments.

The hub 132 typically rotates about a substantially horizontal axis along a drive shaft (not shown) extending from the hub 132 to the nacelle 120. The drive shaft is usually coupled to one or more components in the nacelle 120, which are configured to convert the rotational energy of the shaft into electrical energy.

Although the WTG 100 shown in FIG. 1 has three blades 140, it should be noted that a WTG may have a different number of blades. It is common to find WTGs having two to four blades. The WTG 100 shown in FIG. 1 is a Horizontal Axis Wind Turbine (HAWT) as the rotor 130 rotates about a horizontal axis. It should be noted that the rotor 130 may rotate about a vertical axis. Such a WTG having its rotor rotate about the vertical axis is known as a Vertical Axis Wind Turbine (VAWT). The WTG embodiments described henceforth are not limited to HAWTs having 3 blades. They may be implemented as both HAWTs and VAWTs, having any number of blades 140 in the rotor 130.

Each of the blades 140 may also be equipped with a bending moment sensor 142 (i.e., a load sensor), such as a strain-gauge, accelerometer, vibration sensor, or any other type of sensor capable of measuring at least a magnitude of a bending moment experienced by a WTG blade. The bending moment sensor 142 may be positioned at a root end of the blade to sense stress due to a flap bending moment of the blade, i.e., a moment that causes the blade to deflect in a direction normal to the plane of the rotor 130. Although the wind turbine 100 is depicted as having only one bending moment sensor 142 on each blade 140, multiple bending moment sensors 142 may be included on each blade (or fewer than each blade) at various positions, e.g., at 20%, 40%, 50%, 60%, 75% and 80% of the blade radius from the blade root. Moreover, at least some of the multiple bending moment sensors 142 (or, alternatively, at least one additional bending moment sensor) may be positioned to measure an edge bending moment, i.e., a moment that causes the blade to deflect in a direction substantially within the plane of the rotor 130, rather than a flap bending moment. Alternatively, only a single one of the blades 140 may be equipped with one or more bending moment sensors 142.

Furthermore, in addition to positioning one or more bending moment sensors 142 on or within each blade 140, one or more additional sensors may be used to control or log data about operation of the WTG 100 or its operating environment. For example, the WTG 100 may include a sensor at the back of the nacelle 120 in the form of an accelerometer. The accelerometer may be mounted in such a way that the accelerometer measures horizontal or substantially horizontal oscillations of the nacelle, which may result from edgewise oscillations of the blades. Other possible sensors include a wind speed sensor, a wind direction sensor, a wind thrust force sensor, a generator speed sensor, a temperature sensor, an air density sensor, a WTG location detecting sensor (e.g. a GPS receiver), a blade pitch angle sensor, a blade angle of attack sensor, a tower top acceleration sensor, a rotor speed sensor, etc. Furthermore, some sensors included on the WTG may be configured for use in measuring certain characteristics of the WTG (including, e.g., characteristics that the foregoing sensors measure more directly) based on a physical model and/or knowledge of operating parameters, such as WTG altitude, blade masses and inertia, a blade length, and/or a gearbox ratio. Sensors other than the bending moment sensors 142 are sometimes referred to in the description and figures as "other sensors" for brevity.

Figure 2:
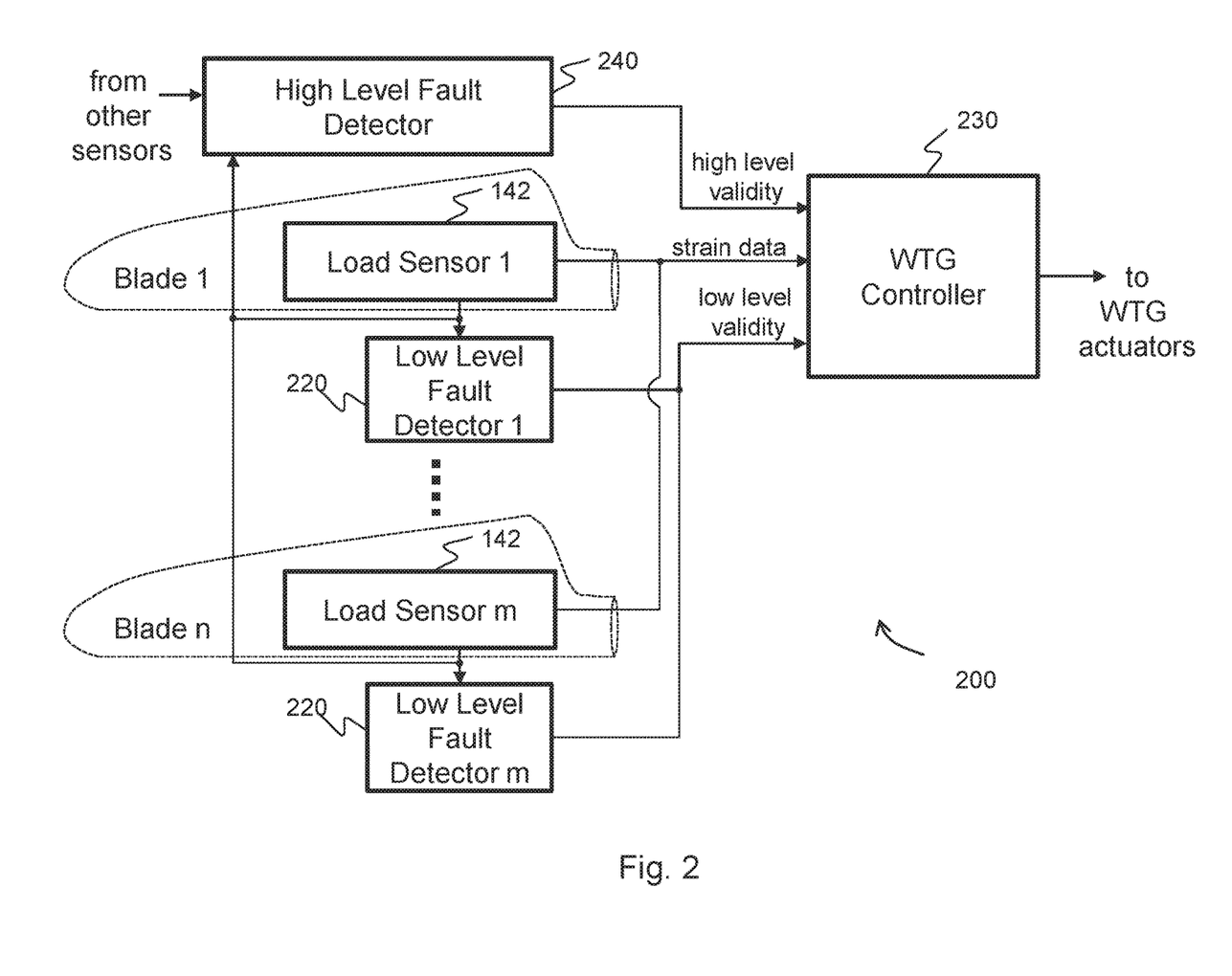
FIG. 2 shows a system for detecting a fault mode for a load sensor on a WTG, such as the WTG of FIG. 1.
Figure 3:
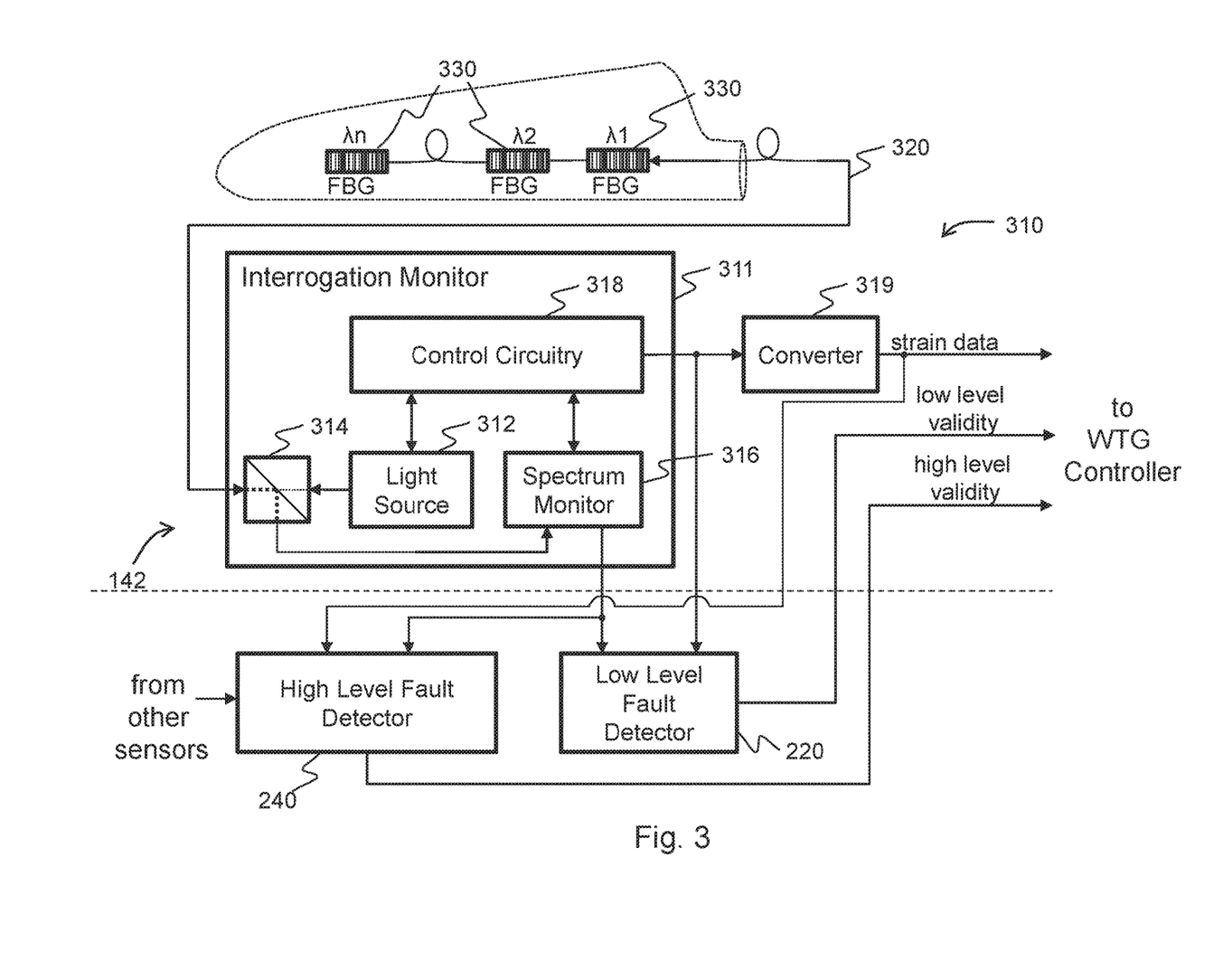
FIG. 3 shows a more detailed view of certain portions of the system in FIG. 2.

FIG. 2 shows a functional block diagram of an example system 200 that implements an example method of detecting fault modes of one or more sensors. FIG. 3 shows a functional block diagram of certain components in the system 200 in greater detail. Thus, the following description of the system 200 is made with reference to both FIGS. 2 and 3.

In the example system shown, the one or more sensors are blade bending moment sensors 142 (i.e., load sensors) on blades of the WTG 100. However, the system 200 is not limited to use with load sensors on blades of a WTG and may instead be used in other contexts and with other types of sensors. Moreover, it should be noted that the number of blades n shown in FIG. 2 may be any positive integer. In addition, the number of load sensors m may be any positive integer and may differ from the number of blades n. For example, fewer than all blades may be equipped with load sensors. Alternatively, each blade may be equipped with a load sensor. In addition, or alternatively, one or more additional components of the WTG (e.g., the tower) may be equipped with a corresponding load sensor.

The system 200 also includes low level fault detectors 220 for each load sensor and a high level fault detector 240. The load sensors 142, low level fault detectors 220, and high level fault detector 240 produce outputs that are fed to a WTG controller 230 that in turn produces one or more outputs that are fed to one or more WTG actuators or other controllable components. For example, the load sensors 142 generate bending moment data (also referred to herein as strain data) that is fed to the WTG controller 230 and the WTG controller 230 sends commands to actuators, such as pitch actuators that control blade pitch, in dependence on the bending moment data to control the bending moment experienced by the blades. The pitch actuators may be individually or collectively controllable. Other actuators that may be controlled in dependence on bending moment data include yaw motors and components that affect generator torque, speed, and/or power.

Each load sensor 142 is subject to entering fault modes during operation. The low level fault detectors 220 and high level fault detector 240 are configured to detect at least some of the fault modes, the high level fault detector 240 detecting fault modes that might be missed by the low level fault detectors 220 (and vice-versa). Each low level fault detector 220 is associated with a corresponding load sensor 142. Each low level fault detector 220 compares data output by the corresponding one of the load sensors 142 with reference data expected to be output by the load sensor 142. Each low level fault detector 220 performs the comparison and produces a comparison result (i.e. a low level validity indication) indicating whether the output data matches the reference data. The comparison may be implemented using a statistical test, such as a generalized likelihood ratio test or a cumulative sum test. The statistical test may be designed to detect small changes with a designed probability of missed detection and/or false alarm. Accordingly, the reference data may be provided in the form of a mean value and, optionally, may include a variance value derived from a statistically significant number of output samples.

The low level validity indication is fed to the WTG controller 230. Based at least in part on the low level validity indication, the WTG controller 230 determines whether the load sensor 142 has entered a fault mode and may optionally take measures to address the fault mode by, e.g., controlling the faulty load sensor to compensate for the fault mode and/or by reducing or eliminating the dependence of any of its actuator control operations on the output of the faulty load sensor. The low level validity indication may be produced in the form of a truth table listing a binary value (e.g., valid/not valid) for each of a plurality of possible fault modes, or may be in the form of multi-level or graded values indicating a degree of to which the load sensor is operating in a fault mode for each possible fault mode. Alternatively, the low level validity indication may be some combination of a truth table and graded values. Example fault modes are discussed below with reference to FIGS. 3 and 4.

The reference data may be derived using a model derived from knowledge of the properties of the sensor. For example, the reference data can be obtained based on design and/or specification parameters provided in documentation produced by a manufacturer of the sensor and/or from observed conditions in which the sensor is operating. Alternatively, the reference data may be produced by each sensor during an initialization phase in which each load sensor 142 is operated in a controlled environment. The controlled environment may be one in which the blade is experiencing substantially no loading or bending moment. Such an environment may be achieved, for example, by pitching the blades a certain direction, waiting until little or no wind is present, or in a manufacturing facility during an assembly phase of the WTG. Alternatively, if the performance of each load sensor 142 has little to no variation with respect to the performance of other load sensors 142, the reference data for all low level fault detectors 220 may be provided by operation of a single one of the load sensors 142 or by operation of a reference load sensor that is not provided on the WTG 100.

Moreover, each low level fault detector 220 may include therein a memory module that stores the reference data. Alternatively, the system 200 may include a single memory module that stores the reference data for each low level fault detector 220 to reference and use during its comparison operation. Moreover, although multiple load sensors are shown in the system 200, embodiments having only a single load sensor associated with a single blade of a multi-blade WTG are also contemplated.

As shown in FIG. 3, the load sensors 142 may be implemented using sensor circuitry 310 and an optical fiber 320 having one or more phase masks, which may be in the form of fiber bragg gratings (FBG) 330. To avoid undue complexity, FIG. 2 depicts the entirety of each of load sensors 142 located inside a hollow center portion of a blade of the WTG 100. However, as shown in FIG. 3, only the FBGs 330 of each load sensor 142 and a portion of the optical fiber 320 may actually be located inside the corresponding blade. The sensor circuitry 310 may reside in a central hub or elsewhere in the WTG 100 and may be communicatively coupled to the FBGs 330 via a portion of the optical fiber 320. In one embodiment the load sensors 142 are implemented with FBGs 330 and sensory circuitry 310 that are manufactured by Ibsen Photonics, a company with headquarters located at Ryttermarken 15-21, DK-3520 Farum, Denmark. For example, Ibsen Photonics' I-MON 80D interrogation monitor may be used.

The sensor circuitry 310 includes an interrogation monitor 311, which in turn includes a light source 312 (e.g., a superluminescent diode (SLED) or an amplified spontaneous emission (ASE) source), an optical circulator 314, a spectrum monitor 316, and control circuitry 318 that controls operation of the light source 312 and the spectrum monitor 316. In addition, the sensor circuitry 310 includes a converter 319 that converts an output of the interrogation monitor 311 into bending moment data that is sent to the WTG controller 230. Although the optical fiber 320 is shown as providing a link between the interrogation monitor 311 and the FBGs 330 of a single load sensor in a single blade, the interrogation monitor 311 may be linked by the optical fiber 320 to multiple, separately located load sensors.

In operation, the light source 312 emits broadband light into the optical fiber 320. Each FBG 330 reflects a peak or narrow band of the broadband light. Moreover, each FBG's reflected peak may be centered around a characteristic wavelength (depicted in FIG. 3 as λ1, λ2, . . . λn) that differs from the characteristic wavelengths of the other FBGs 330 in the optical fiber 320 to facilitate identification of which reflection corresponds to which FBG. The FBGs 330 are mounted on an inner surface of the blade, which stretches and compresses during operation. Therefore, the FBGs 330 also undergo the stretching and compressing along with the blade, which affects the frequency response of the FBGs. Specifically, the FBG's characteristic wavelength will shift in proportion to the bending or compression experienced, thereby providing a measure of the bending moment experienced by the blade.

The interpretation of characteristic wavelength shifts to bending moment data is accomplished by the spectrum monitor 316, control circuitry 318, and converter 319. More specifically, the peaks of reflected light are reflected back toward the interrogation monitor 310. The optical circulator 314 directs the reflected light to the spectrum monitor 316 and the spectrum monitor includes a light receiver that converts the received optical reflections into electrical signals that carry bending moment data and that are fed to the control circuitry 318. The control circuitry 318 detects the frequencies of the different peaks of reflected light and determines an amount by which the frequencies are shifted. This information is fed to the converter 319 for conversion to bending moment data using a predetermined mathematical relationship. However, if the load sensor 142 enters a fault mode, the bending moment data can become unreliable, which can degrade control operations that depend on the bending moment data, thereby degrading performance of the WTG 100 and potentially causing harmful damage.

Figure 4:
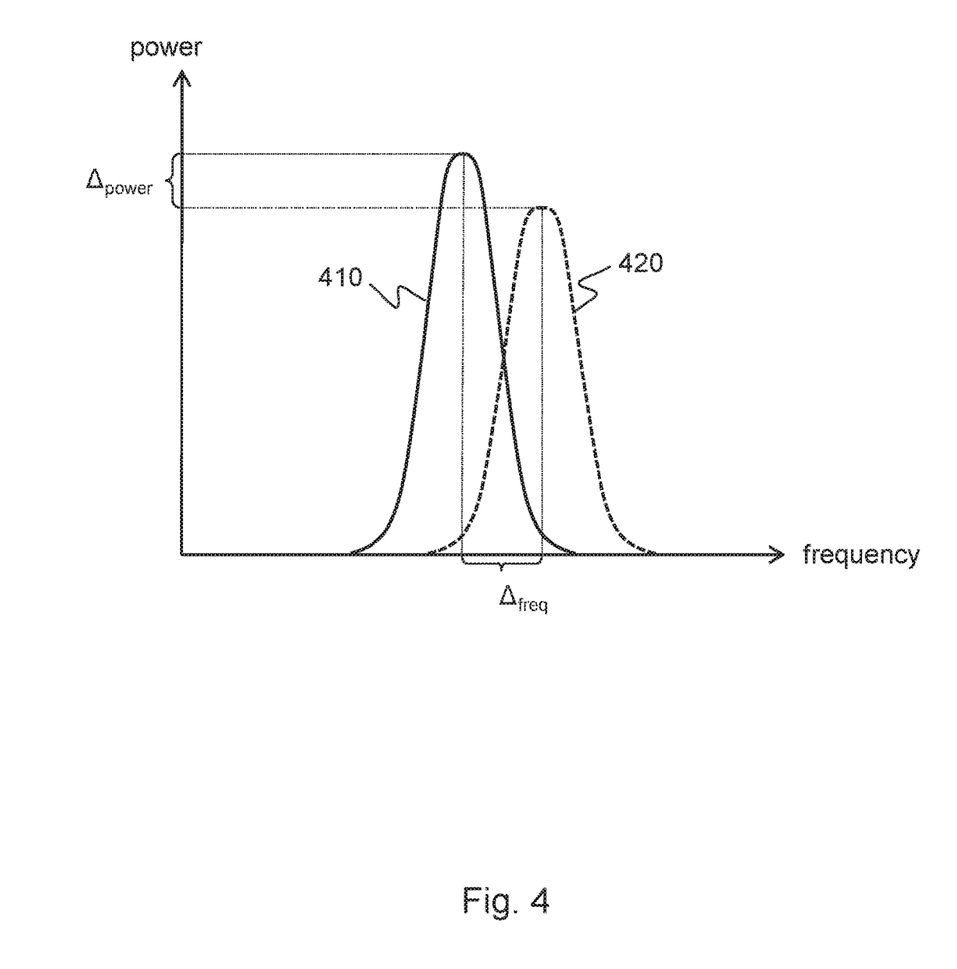
FIG. 4 shows a graph of on which is depicted both an example nominal signal and an example faulty signal that may be produced by the load sensor in FIGS. 2 and 3.

FIG. 4 shows a power versus frequency graph on which is depicted a nominal optical signal 410 reflected by a particular one of the FBGs 330 that is not experiencing a bending moment. In accordance with the discussion above regarding the FBGs 330, the nominal optical signal 410 has a peak that is centered around a characteristic wavelength that is unique to the associated FBG 330. A fault mode of the associated load sensor 142 may be exhibited by a change of power and/or change of characteristic wavelength of the nominal optical signal 410. For example, the FBG 330 may enter a fault mode in which it produces a faulty optical signal 420 that is lower in power and/or higher in frequency than the nominal optical signal 410. Such fault modes may occur due to, for example, temperature swings, hardware and/or software bugs, short circuits, general wear and tear, etc. Furthermore, although the faulty optical signal 420 suffers changes in both power and frequency, the faulty optical signal 420 may instead suffer only a change in power or only a change in frequency. Moreover, a fault mode may be exhibited in other ways including, for example, power increase, a downshift in frequency, excess signal noise, etc., in the faulty optical signal 420.

During normal operation, the spectrum monitor 316 outputs the nominal optical signal 410 (and may output other similar optical signals corresponding to other FBGs 330, if present). This output data is fed not only to the control circuitry 318, but also to the low level fault detector 220, which compares the output data with reference data expected to be output by the spectrum monitor 316. Comparing the output data with reference data may include comparing a signal power level indicated by the output data with a signal power level indicated by the reference data to produce a power comparison result (e.g., a value representing the $\Delta_{power}$ quantity shown in FIG. 4). In addition, or alternatively, the comparing the output data with reference data may include comparing a mean signal frequency indicated by the output data with a mean signal frequency indicated by the reference data to produce a mean frequency comparison result (e.g., a value representing the $\Delta_{freq}$ quantity shown in FIG. 4). Another check that may be performed by low level fault detector 220 is a peak count to make sure an expected number of peaks are received. For example, if five FBGs 330 are included in the load sensor under test but only four peaks are counted this result will indicate a fault mode. The peak count, power comparison result and/or mean frequency comparison result may be provided as part of the low level validity indication.

By performing the foregoing comparison(s), the low level fault detector 220 is able to detect if the load sensor 142 has entered a fault mode. For example, during faulty operation, the spectrum monitor 316 might output the faulty optical signal 420, which, as discussed above, would be detected as a faulty signal by the statistical comparison operations performed by the low level fault detector 220. The low level fault detector 220 may then output a negative low level validity indication to the WTG controller 230 as a warning for the WTG controller 230 to ignore or reduce dependence on the faulty load sensor and/or to take corrective action. In addition, or alternatively, the negative low level validity indication may be sent to the control circuitry 318 as a warning for the control circuitry 318 to ignore the sensor output and/or to take corrective action. Moreover, the negative low level validity indication may include information about which particular FBG or FBGs are faulty if only one or a select number of FBGs are found to be faulty.

Some fault modes may not be detected by the low level fault detector 220 or may not be detected in a timely manner. Therefore, the system 200 may also include a high level fault detector 240. The high level fault detector 240 may be fed the same output data as each low level fault detector 240 but may compare the output data to other data to produce a second comparison result (i.e., a high level validity indication). The high level validity indication may be provided in the form of a truth table, graded values, or some combination thereof, as discussed above with respect to the low level validity indication. Moreover, the other data evaluated by the high level fault detector 240 may be received from (or derived from data received from) other sensors, including sensors that are configured for use in measuring characteristics of the WTG other than a blade bending moment, such as a generator speed measurement, a generator power measurement, a generator torque measurement, a nacelle acceleration measurement, a tower acceleration measurement, a blade acceleration measurement, a WTG location measurement, a blade pitch angle measurement, a blade pitch angle of attack measurement, a rotor speed measurement, and/or an internal temperature measurement. In addition, or alternatively, the other data may be received from (or derived from data received from) sensors that are configured for use in measuring characteristics of the environment in which the WTG operates, such as a wind speed measurement, a wind direction measurement, a wind thrust force measurement, an air density measurement, and/or an ambient temperature measurement. Receiving data from other sensors facilitates detection and diagnosis of fault modes in the load sensors 142 that may not be easily detected by the low level fault detector 220, including long term frequency drifts of an FBG 330. In addition, or alternatively, the high level fault detector 240 may compare the data output from a first one of the load sensors 142 with the data output from a second one of the load sensors 142. The high level fault detector 240 may also be fed the bending moment or strain data produced by the converter 319 of the load sensor 142 to verify correct operation of the converter 319.

The data output from each load sensor 142 may be affected by the azimuth angle of the corresponding blade due to, for example, tower shadow effects on loads. Therefore, as part of comparing data output from a first load sensor 142 with data output from a second load sensor 142, the high level fault detector 240 may temporally shift one or both sets of data to align the azimuth angles of each set of data. To facilitate such temporal shifting, the high level fault detector 240 may receive measurements made by an azimuth angle sensor or may derive the azimuth angle from load sensor data. Such a comparison may not only compensate for difference in azimuth angle but also for rotor speed and/or turbulence intensity.

Moreover, when comparing data output by different types of sensors the high level fault detector 240 may refer to a predetermined relationship that relates the two sets of data. For example, the data output by a wind speed sensor cannot directly be compared to data output by the load sensors 142. Thus, one or both sets of data may be processed according to a predetermined relationship that may be derived empirically and/or from known physical laws that relate the sets of data as part of the comparison operation. Moreover, the processing may depend on additional data from other sensors and/or known parameters. For example, an estimate of expected wind speed may be derived from load sensor data using a predetermined relationship and the estimated wind speed may be compared to the wind speed measured by a sensor to determine whether the load sensor producing the load sensor data is faulty. Other example high level detection operations may be performed using one or more residual generators created based on models of WTG operations that at least partially depend on or affect the outputs of the load sensors 142 according to certain known physical relationships (derived empirically and/or from physical laws). Residuals produced by residual generators are signals defined to have a zero mean and a known standard deviation. Thus, a fault mode can be detected when the mean of a residual deviates significantly from zero or the standard deviation of the residual deviates significantly from the known standard deviation. The amount of deviation can be measured by a statistical test, such as a generalized likelihood ratio test or a cumulative sum test, which facilitate tuning the likelihood of false alarms and/or missed detections.

The low level and high level fault detectors 220, 240 may perform fault detection automatically at regular or irregular intervals and/or in response to a command from a controller, such as the WTG controller 230. Moreover, the low level and high level fault detectors 220, 240 may be implemented using circuitry that includes hardware, software encoded on computer-readable media including programmable and non-programmable media, or any combination of the foregoing. When a fault mode is detected by either the low level or high level fault detector 220, 240, the detector may send an indication of the detected fault mode to the WTG controller 230 or the control circuitry 318. The WTG controller 230 or the control circuitry 318 may then compensate for the detected fault mode. Compensation may include, for example, ignoring the output of the faulty load sensor. Alternatively, the control circuitry 318 may control the light source 312 to boost power based on the $\Delta_{power}$ value reported by the low level fault detector 220 and/or may process the output of the spectrum monitor 316 based on the $\Delta_{freq}$ value reported by the low level fault detector 220.

Figure 5:
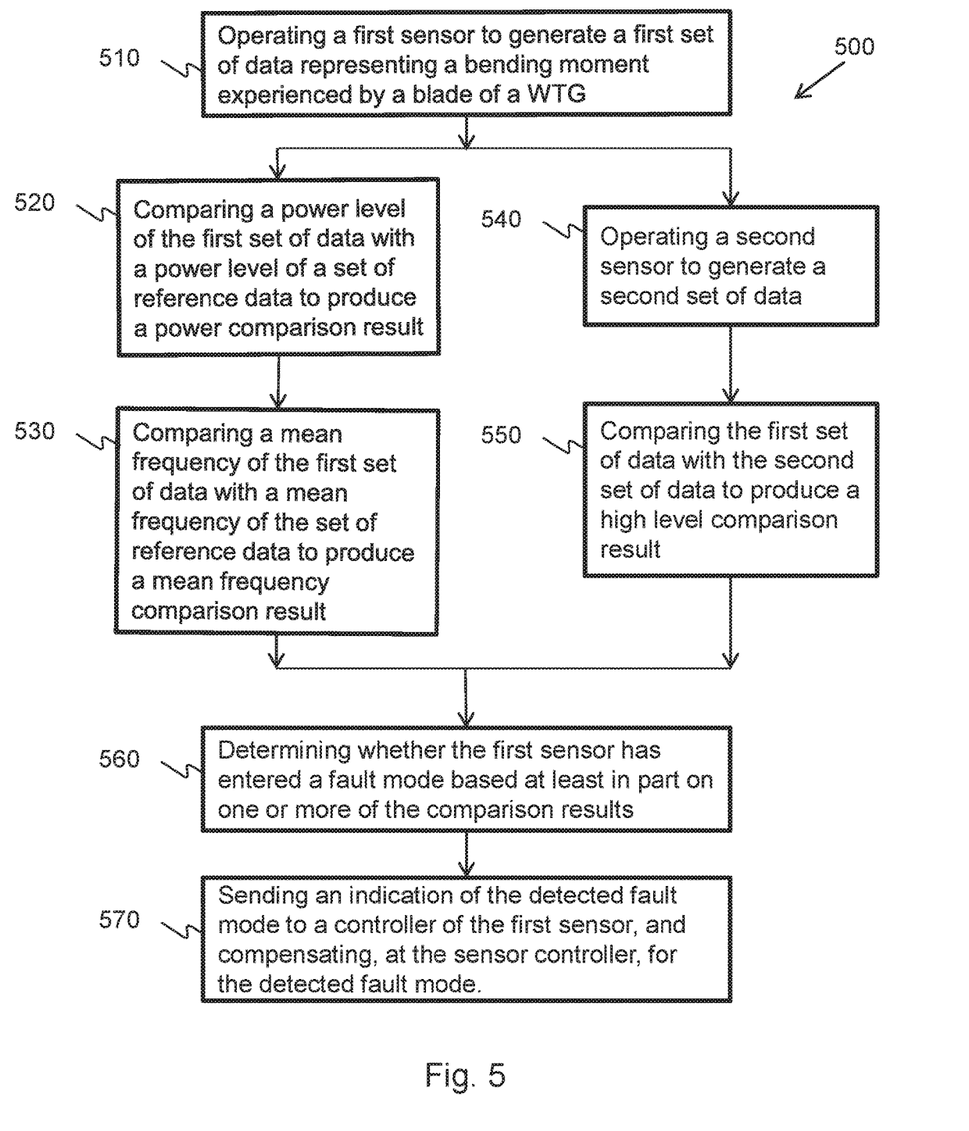
FIG. 5 illustrates a flow diagram representing an example method of detecting whether a sensor has entered a fault mode.

The foregoing systems may be used to implement various different fault mode detecting methods. FIG. 5 shows a flow diagram representing an example method 500 of detecting a fault mode in a sensor, such as one of the load sensors 142. The method may be carried out by the system 200 in FIGS. 2 and 3. At stage 510, a first sensor, such as one of the load sensors 142, is operated to generate a first set of data (i.e., a first set of one or more data points) representing a bending moment experienced by a blade of a WTG. At stages 520 and 530, fault mode detection is performed at a low level by comparing the first set of data with a set of reference data to produce one or more comparison results. More specifically, at stage 520 a signal power level indicated by the first set of data is compared with a signal power level indicated by the set of reference data to produce a power comparison result and at stage 530 a mean signal frequency indicated by the first set of data is compared with a mean signal frequency indicated by the set of reference data to produce a mean frequency comparison result. The low level fault detector 220 may perform the foregoing comparison stages 520 and 530.

Although both of the comparison stages 520 and 530 are depicted as being performed, in an alternative method only a single one of the stages 520 and 530 is performed. In addition to or instead of performing one or both of the comparison stages 520 and 530, additional comparison stages may be performed to compare other aspects of the first set of data with corresponding aspects of the set of reference data.

In addition to performing low level fault mode detection, the method 500 includes stages 540 and 550 that pertain to high level fault mode detection. The high level fault mode detection stages may be performed in parallel (as shown) or in series with the foregoing low level fault mode detection stages 520 and 530.

The high level fault mode detection stages include stages 540 and 550. At stage 540, a second sensor is operated to generate a second set of data. The second set of data may represent a bending moment experienced by another blade of the WTG. Alternatively, the second set of data may represent a bending moment experienced by another, non-blade component of the WTG or may represent other characteristics of the WTG or its operating environment, such as wind speed, wind direction, generator speed, generator torque, or the like. At stage 550, the first set of data is compared with the second set of data to produce a high level comparison result. The high level fault detector 240 may perform this comparison operation. As part of the comparison, one or both sets of data may be processed, if necessary. For example, an estimate of the second set of data may be generated based on the first set of data (or vice-a-versa) for meaningful comparison with the second set of data. This data processing may also be performed by the high level fault detector 240.

At stage 560 a determination is made as to whether the first sensor has entered a fault mode based at least in part on one or more of the comparison results. This determination may be made by either the low level fault detector 220 or the high level fault detector 240. It is possible for both the low level fault detector 220 and the high level fault detector to make the determination that the first sensor has entered a fault mode. For example, the low level fault detector 220 may make a determination of whether the first sensor has entered a fault mode based on the low level comparison results (power and mean frequency comparison results) and the high level fault detector 240 may make a similar determination based on the high level comparison result. These determinations may be based on multiple data set comparisons made at different times at both the low level and high level. Moreover, at the high level the determination may be made based on various different sets of data from different sensors of the same type or different types.

At stage 570, an indication of the detected fault mode is sent to a controller of the first sensor, such as the WTG controller 230 and/or the control circuitry 318, and compensation is performed at the sensor controller for the detected fault mode. The indication of fault mode may be sent by either the low level fault detector 220 or the high level fault detector 240. Moreover, if the first sensor is the load sensor 142 and the fault mode is detected at the low level, the compensation may include modifying power output by the light source 312 based at least in part on the power comparison result and/or compensating for a frequency offset based at least in part on the mean frequency comparison result. Compensation for the detected fault mode may also include disabling the first sensor and/or reducing or eliminating the dependence of any actuator control operations on the output of the first sensor.

The method 500 is provided by way of example, not limitation, and may be modified in various ways, including omission and/or repetition of certain stages, as well as addition of other stages. For example, in one alternative embodiment of the method 500, the low level fault detector does not send an indication of the detected fault to a sensor controller at stage 570 and instead controls the first sensor to compensate for the fault mode. Moreover, in other alternative embodiments of the method 500, either the low level fault mode detection stages (stages 520 and 530) or the high level fault mode detection stages (stages 540 and 550) are omitted and only a single level (low or high) of fault mode detection is performed. Furthermore, stage 570 may be omitted in some embodiments if, for example, the sensor controller has no way of compensating for the detected fault mode or if such compensation is impractical. Thus, the determination of whether the first sensor has entered a fault mode may simply be flagged for a technician to service (e.g., by inspecting, repairing, and/or replacing) the faulty sensor immediately or during a scheduled maintenance operation. Furthermore, the method 500 may be adapted for use with load sensors used on structures other than WTGs and/or with types of sensors other than load sensors.

In addition, the method 500 or portions thereof may be repeated as necessary. For example, if the high level comparison result indicates a fault mode and the low level comparison result is unavailable or uncertain it may not be clear whether the first sensor or the second sensor is faulty. Therefore, stages 540 and 550 may be repeated one or more additional times using additional data sets from the same or other sensors (if available) to aid in determining whether the first sensor or second sensor is faulty. Moreover, additional stages that are not shown may be added to the method 500. For example, a stage for counting a number of peaks received by the load sensor 142 may be included to detect a fault mode in which a number of peaks that are received does not correspond to a number of FBGs in the load sensor 142.

Example methods and systems described herein may be used to detect fault modes of a sensor. The sensor in one example embodiment is a bending moment sensor used in a blade of a WTG. The example methods and systems include fault detection at a low level and/or at a high level. At the low level, the output of the sensor is compared to reference data and at the high level the output of the sensor is compared to the output of other sensors, which may include other types of sensors that measure other types of data.

It should be emphasized that the embodiments described above are possible examples of implementations which are merely set forth for a clear understanding of the principles of the invention. The person skilled in the art may make many variations and modifications to the embodiment(s) described above, said variations and modifications are intended to be included herein within the scope of the following claims.

The invention claimed is:

1. A method for detecting a fault mode of a first sensor, the method comprising:
comparing, with sensor circuitry, data output by the first sensor with reference data indicating what is expected to be output by the first sensor to produce a first comparison result, wherein the reference data includes at least one of: pre-determined data output of the first sensor during operation in a controlled environment, and model data output from a model, wherein the model includes at least one relationship determining the model data output as a function of observed operating conditions and knowledge of properties of the first sensor;
comparing, with the sensor circuitry, the data output by the first sensor with a second data output by a second sensor to produce a second comparison result;
determining, with the sensor circuitry, whether the first sensor has entered a fault mode based at least in part on the first and the second comparison results; and
upon the sensor circuitry determining that the first sensor has entered the fault mode, the sensor circuitry issues an indication of the fault mode to a controller of a wind turbine generator (WTG) that configures the controller to issue pitch commands to adjust a blade pitch of the wind turbine generator, wherein the pitch commands are based on the controller performing at least one of: ignoring an output of the first sensor and reducing a reliance on the first sensor.

2. The method of claim 1, wherein the first sensor is configured for use in measuring a first characteristic of a structure and the second sensor is configured for use in measuring a second characteristic of the structure.

3. The method of claim 2, wherein:
the structure is the wind turbine generator including blades,
the first characteristic of the structure is a bending moment experienced by a first blade of the wind turbine generator, and
the second characteristic of the structure is one of: a bending moment experienced by a second blade of the wind turbine generator, a rotation speed of a generator of the wind turbine generator, an acceleration of a nacelle of the wind turbine generator, an acceleration of the first blade of the wind turbine generator, a thrust force of wind on the WTG, a rotation speed of a rotor of the wind turbine generator, and a pitch angle of at least one of the blades of the wind turbine generator.

4. The method of claim 1, wherein the first sensor is configured to measure a characteristic of a structure and the second sensor is configured to measure a characteristic of the environment in which the structure is located.

5. The method of claim 4, wherein:
the structure is the wind turbine generator including blades,
the characteristic of the structure is a bending moment experienced by a blade of the wind turbine generator, and
the characteristic of the environment is one of: a wind speed, a wind direction, a density of air surrounding the wind turbine generator, and a temperature of air surrounding the wind turbine generator.

6. The method of claim 1, further comprising:
sending an indication of the detected fault mode to a controller of the first sensor when determining that the first sensor entered the fault mode; and
compensating, at the controller of the first sensor, for the detected fault mode.

7. The method of claim 1, wherein the reference data includes the pre-determined data output of the first sensor during operation in the controlled environment.

8. The method of claim 7, wherein the reference data further includes the model data output from the model.

9. The method of claim 1, wherein the reference data includes the model data output from the model.

10. The method of claim 1, wherein the pitch commands are based on the controller reducing, without entirely eliminating, the reliance on the first sensor.

11. A method of operating a wind turbine generator (WTG) comprising a first sensor, the method comprising:
operating the first sensor using sensor circuitry included in the WTG, wherein the sensor circuitry receives data from the first sensor representing a bending moment experienced by a blade of the WTG;
comparing the data from the first sensor with data from a second sensor to produce a comparison result;
determining whether the first sensor has entered a fault mode based at least in part on the comparison result;
communicating a sensor validity indication from the sensor circuitry to a WTG controller based on whether the first sensor has entered the fault mode; and
communicating, from the WTG controller, commands to control operation of one or more actuators of the WTG based at least on (i) the bending moment experienced by the blade and (ii) the sensor validity indication.

12. The method of claim 11, wherein the first sensor includes:

a fiber bragg grating (FBG) placed on a surface of the blade,
wherein the sensor circuitry is optically coupled to the FBG via an optical fiber, wherein the sensor circuitry includes:
a light source configured to emit a light signal; and
a light receiver configured to receive a reflection of the light signal from the FBG and to convert the reflected light signal into the data representing the bending moment experienced by the blade.

13. The method of claim 11, wherein the one or more actuators of the WTG comprise one of the following:
a pitch actuator configured to control a blade pitch of the WTG;
a yaw motor configured to control a yaw of the WTG; and
one or more components configured to control one or more of a torque, speed, and a power of the WTG.

14. An apparatus, comprising:
low level fault detection circuitry configured to compare data output by a first sensor with reference data to detect a first fault mode of the first sensor, wherein the reference data includes at least one of: pre-determined data output of the first sensor during operation in a controlled environment, and model data output from a model, wherein the model includes at least one relationship determining the model data output as a function of observed operating conditions and knowledge of properties of the first sensor;
high level fault detection circuitry configured to compare data output by the first sensor with data output by a second sensor to detect a second fault mode of the first sensor; and
a controller arranged to adjust a blade pitch of a wind turbine generator by issuing pitch commands to adjust a blade pitch of the wind turbine generator, wherein upon the controller receiving an indication of at least one of the first and the second fault modes from the low and the high level fault detection circuitry, the controller is configured to perform at least one of: ignoring an output of the first sensor and reducing a reliance on the first sensor.

15. The apparatus of claim 14, wherein the reference data includes the pre-determined data output of the first sensor during operation in the controlled environment.

16. The apparatus of claim 15, wherein the reference data further includes the model data output from the model.

17. The apparatus of claim 14, wherein the reference data includes the model data output from the model.

18. The apparatus of claim 14, wherein the controller is configured to reduce, without entirely eliminating, the reliance on the first sensor.

* * * * *